(12) United States Patent
Wu et al.

(10) Patent No.: US 8,870,432 B2
(45) Date of Patent: Oct. 28, 2014

(54) SHEETLESS BACKLIGHT MODULE, A LIGHT GUIDE PLATE FOR THE SHEETLESS BACKLIGHT AND MANUFACTURING METHOD THEREOF

(75) Inventors: Yu-Ping Wu, Hsin-Chu (TW);
Fu-Cheng Fan, Hsin-Chu (TW);
Wei-Hsiang Tsai, Hsin-Chu (TW);
Wei-Hung Lo, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 120 days.

(21) Appl. No.: 13/475,601

(22) Filed: May 18, 2012

(65) Prior Publication Data
US 2013/0094243 A1  Apr. 18, 2013

(30) Foreign Application Priority Data

Oct. 14, 2011 (TW) .............................. 100137338 A (51) Int. Cl.
*F21V 8/00* (2006.01)
*B23P 17/04* (2006.01)

(52) U.S. Cl.
CPC ............ *G02B 6/0065* (2013.01); *G02B 6/0061* (2013.01); *G02B 6/0036* (2013.01)
USPC ............................. 362/606; 362/615; 362/629

(58) Field of Classification Search
CPC .................................................... G02B 6/0036
USPC .................. 362/97.1, 625, 560, 606–614
See application file for complete search history.

(56) References Cited

U.S. PATENT DOCUMENTS

| | | |
|---|---|---|
| 2003/0030764 A1 | 2/2003 | Lee |
| 2012/0026742 A1* | 2/2012 | Fang et al. ................... 362/355 |

FOREIGN PATENT DOCUMENTS

| | | |
|---|---|---|
| CN | 1397827 A | 2/2003 |
| CN | 101900300 A | 12/2010 |
| EP | 1882880 A1 | 1/2008 |
| EP | 1933178 A1 | 6/2008 |
| EP | 1992870 A2 | 11/2008 |

OTHER PUBLICATIONS

China Office Action dated Sep. 28, 2012.
English translation of abstract of CN 101900300 A, Dec. 1, 2010.

* cited by examiner

*Primary Examiner* — Elmito Breval
(74) *Attorney, Agent, or Firm* — McClure, Qualey & Rodack, LLP (57) ABSTRACT

A sheetless backlight module and a light guide plate thereof are provided. The light guide plate includes a body and a plurality of light scattering units. The body has a bottom and a plurality of microstructures formed on the bottom and recessed in the body from the bottom. The pluralities of light scattering units are disposed in a plurality of spaces formed due to the plurality of microstructures recessed in the body. A manufacturing method of the light guide plate mentioned above includes forming the plurality of microstructures on the bottom of the body; preparing a fluid solution containing at least a diffusive reflective material; distributing the fluid solution on the bottom; driving the fluid solution to flow into the microstructures; removing the part of the fluid solution outside the microstructures; and solidifying the fluid solution to form the plurality of light scattering units.

13 Claims, 13 Drawing Sheets

SHEETLESS BACKLIGHT MODULE, A LIGHT GUIDE PLATE FOR THE SHEETLESS BACKLIGHT AND MANUFACTURING METHOD THEREOF

BACKGROUND OF THE INVENTION

1. Field of the Invention

The present invention generally relates to a sheetless backlight module and a design of a light guide plate for the sheetless backlight module. Particularly, the present invention relates to a sheetless backlight module having a wider range of light-exiting angle and a light guide plate thereof.

2. Description of the Prior Art

Liquid Crystal Display (LCD) devices are extensively used in a variety of electrical devices such as computers, televisions, and mobile phones, wherein a light guide plate is used in a backlight module of the LCD device and is an essential element related to the light utilization efficiency. In addition to the light guidance and the control of exiting-light, the light guide plate is designed to elevate luminance and light uniformity, therefore improving the light utilization efficiency and optimizing the visual quality. In addition, accompanying the technology improvement in the display device industry as well as the user demands, display devices are getting smaller and lighter. According, the interior components/elements of the display devices are required to have the same or even better function under the limited volume or space.

Figure 1A:
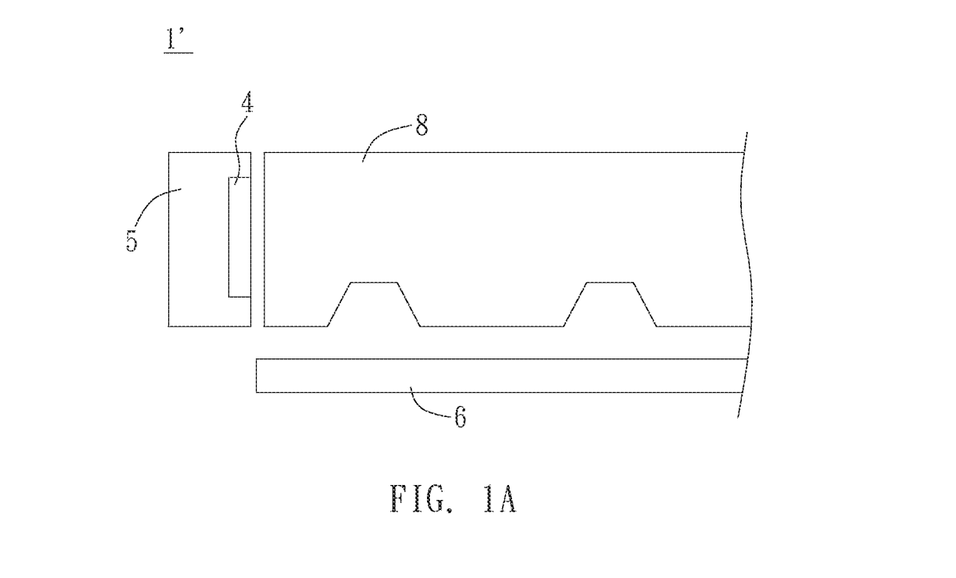
FIG. 1A is a cross-sectional schematic view of the conventional sheetless backlight module.
Figure 1B:
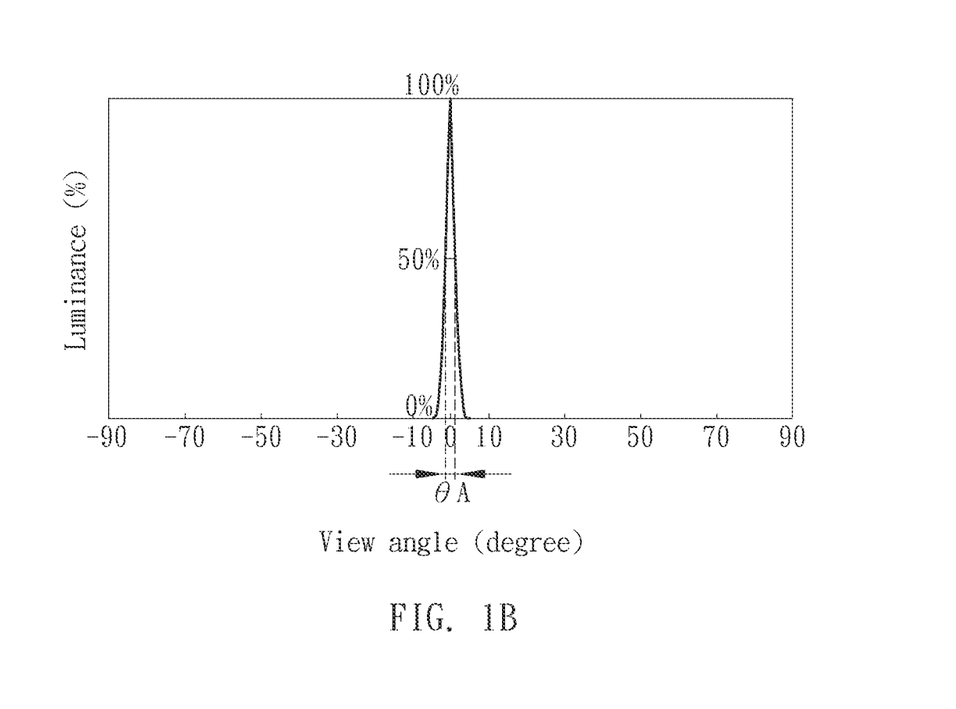
FIG. 1B is a simulation chart of view angle of the conventional sheetless backlight module.

As FIG. 1A shows, the sheetless backlight module 1' has less cost of production due to no optical films such as diffuser or prism films used and therefore is lighter and smaller than the conventional backlight module. On the other hand, since the sheetless backlight module does not use the diffuser film, light exiting thereof is more direct and the light energy is more centralized. However, the sheetless backlight module 1' has defects of hot spot and light ray which are concerned in visual quality. In addition, along with the more-direct light-exiting, the light energy does not disperse enough and the view angle of the backlight module 1' is too small as shown in FIG. 1B.

SUMMARY OF THE INVENTION

It is an object of the present invention to provide a backlight module and a light guide plate to solve the problems of hot spot, light ray, and small view angle.

It is another object of the present invention to provide a backlight module and a light guide plate to improve the light utilization efficiency.

It is another object of the present invention to provide a light guide plate to decrease the cost of production of the backlight module and to reduce the thickness of the backlight module.

The present invention provides a backlight module and a light guide plate. The light guide plate includes a body and a plurality of the light-scattering units. The body has a light-exiting face, a bottom located opposite to the light-exiting face, and a light-entering end connected to the light-exiting face and the bottom. The body further has a plurality of microstructures. The plurality of microstructures are formed on the bottom and recessed in the body to form a plurality of microspaces. In addition, the distribution density of the microstructures on the bottom gradually increases as the distance to the light-entering end increases. The shape of the space formed due to each of the plurality of microstructures includes a truncated cone shape, a cone shape, a truncated pyramid shape, or a pyramid shape, wherein the space has an opening on the bottom. The shape of the opening includes circle or polygon, wherein the diameter of the circular opening is less than 50 micrometer; the diameter of the circumscribed circle of the polygonal opening is less than 50 micrometer. In addition, each space formed due to the microstructure shrinks in a direction away from the opening. As a result, an angle between the normal line of the side wall and the normal line of the bottom is an acute angle less than 50 degrees.

The pluralities of light-scattering units are disposed in the plurality of spaces formed due to the plurality of microstructures recessed in the body. The light-scattering unit is composed of at least a diffusive reflective material. The diffusive reflective material includes titanium dioxide, silicon dioxide, resin, or a combination thereof. The light-scattering units are light-diffusive and a value of bidirection scattering distribution function (BSDF) thereof is greater than a value of BSDF of the body. The light-scattering units can be disposed in the spaces in the manner that the light-scattering unit respectively completely fills the spaces or partially occupying the spaces. The light-scattering unit in the space intimately contacts the top portion of the space and the side wall around the top portion, i.e. the body of the light guide plate around the microstructures is covered by the diffusive reflective material, rather than being exposed to air.

The present invention further provides a manufacturing method of the light guide plate, including steps: forming the plurality of microstructures on the bottom of the body and recessed in the body; preparing a fluid solution containing at least a diffusive reflective material; distributing the fluid solution on the bottom; driving the fluid solution to flow into the plurality of microstructures; removing the fluid solution outside the microstructures; solidifying the fluid solution to form the plurality of light-scattering units in the plurality of microstructures.

DETAILED DESCRIPTION OF THE PREFERRED EMBODIMENT

Figure 2:
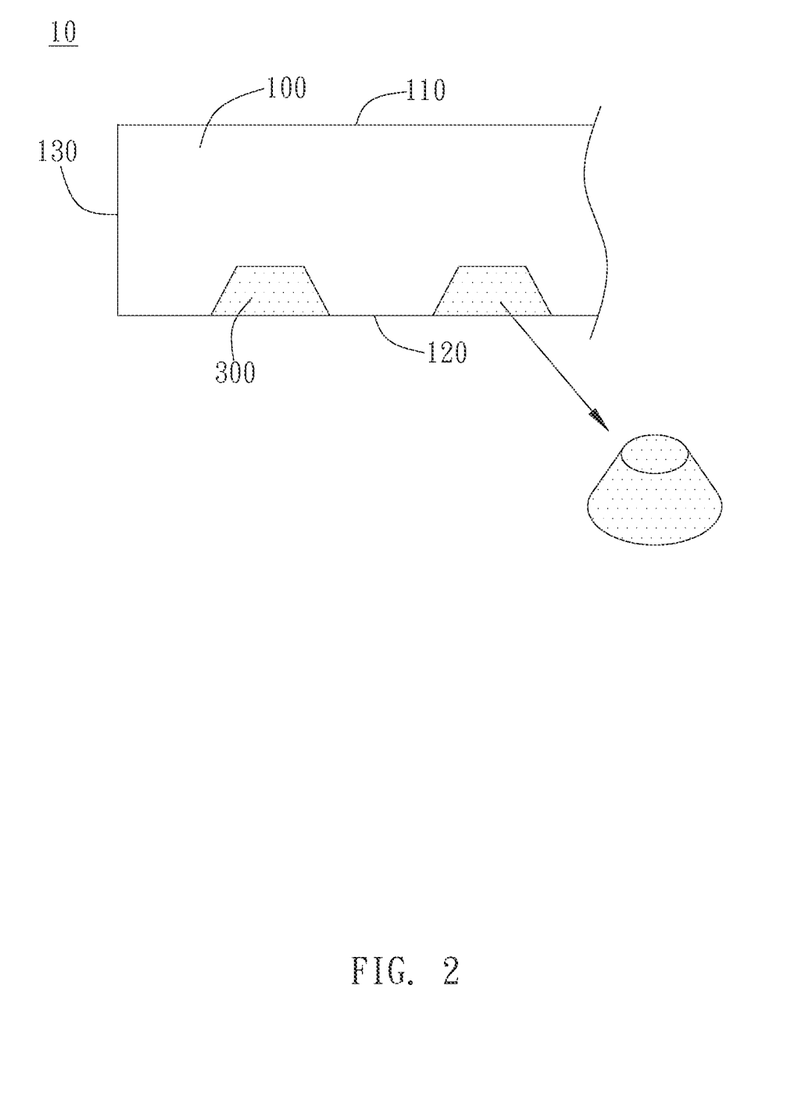
FIG. 2 is a cross-sectional schematic view of the embodiment of the light guide plate of the present invention.

As the embodiment shown in FIG. 2, the light guide plate 10 of the present invention for a sheetless backlight module includes a body 100 and a plurality of light-scattering units 300. The body 100 includes a light-exiting face 110, a bottom 120 located opposite to the light-exiting face 110, and a light-entering end 130 located on one side of the light-exiting face 110 and the bottom 120 and connected to the light-exiting face 110 and the bottom 120. When the light guide plate 10 is used in the backlight module (described later), the light emitted by the light source enters the body 100 through the light-entering end 130. The light preferably leaves the light guide plate 10 from the light-exiting face 110 and then enters such as a display panel. The light-entering end 130 can be located on one side or two opposite sides of the body 100. The plurality of light-scattering units 300 are composed of material(s) different from material(s) of the body 100 and have optical characteristics different from optical characteristics of the body 100. The light-scattering units 300 are preferably formed on the bottom 120 of the body 100.

Figure 3A:
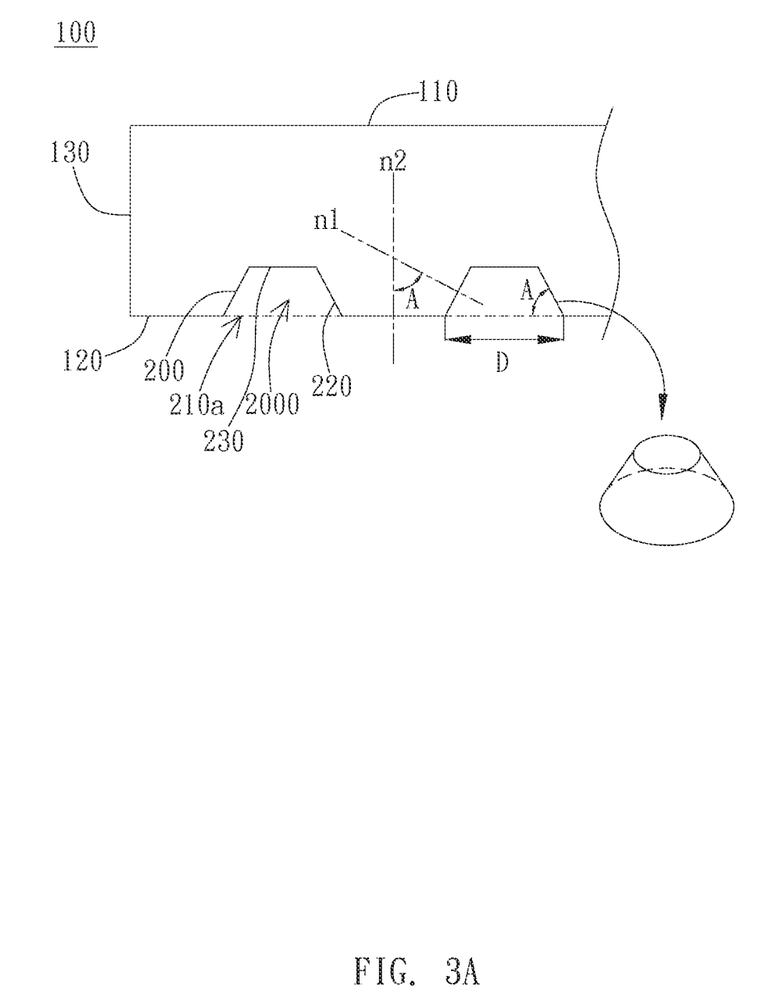
FIG. 3A is a cross-sectional schematic views of the embodiment of the body of the light guide plate of the present invention.
Figure 3B:
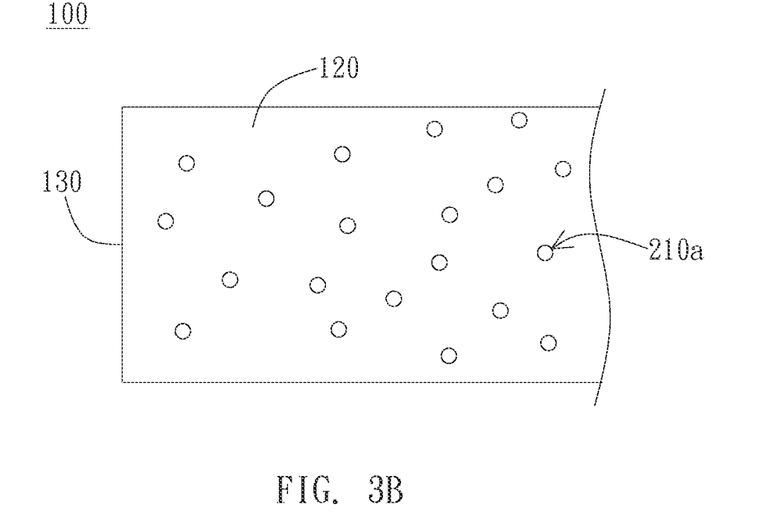
FIGS. 3B-3C are bottom views of the embodiment of the body of the light guide plate of the present invention.
Figure 3C:
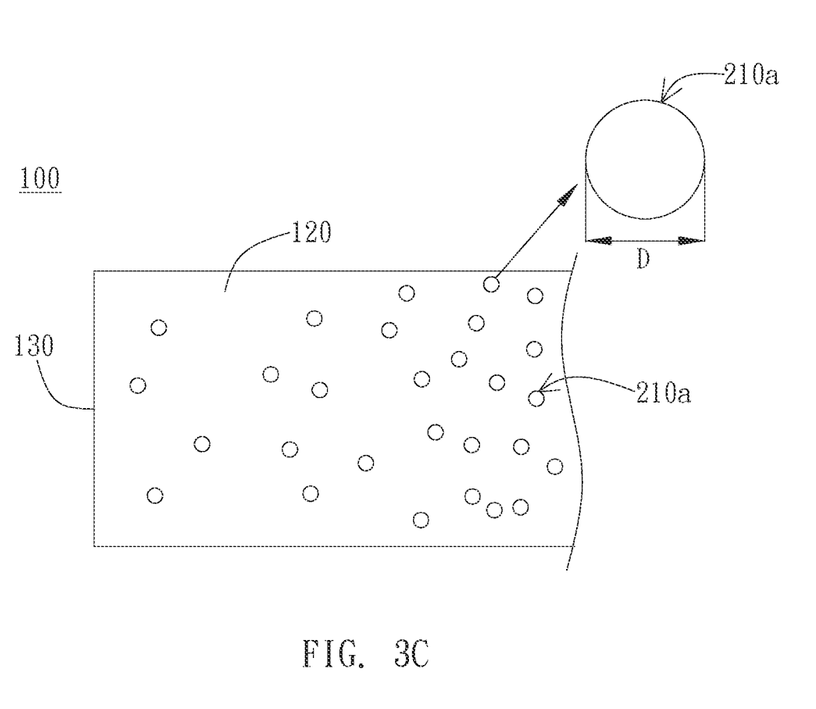

The body 100 further has a plurality of microstructures 200, as shown in FIG. 3A. The plurality of microstructures are formed on the bottom 120 and recessed in the body 100 to form a plurality of microspaces 2000. The plurality of microstructures 200 are distributed evenly or unevenly on the bottom 120, as shown in FIGS. 3B and 3C, respectively. On the other hand, the microstructures may be distributed regularly or irregularly. Preferably, the density of the microstructures 200 distributed on the bottom 120 gradually increases as the distance to the light-entering end 130 increases. As a result, the light exit rate from the light-exiting face 110 closer to the light-entering end 130 is smaller than the light exit rate from the light-exiting face 110 away from the light-entering end 130. Accordingly, the light entering the body 100 from the light-entering end 130 can have a longer retention time and a larger propagation range in the body 100. All in all, the distribution of microstructures 200 shown in FIG. 3C can elevate uniformity of the light exiting from the light-exiting face 110 of the light guide plate 10.

Figure 4A:
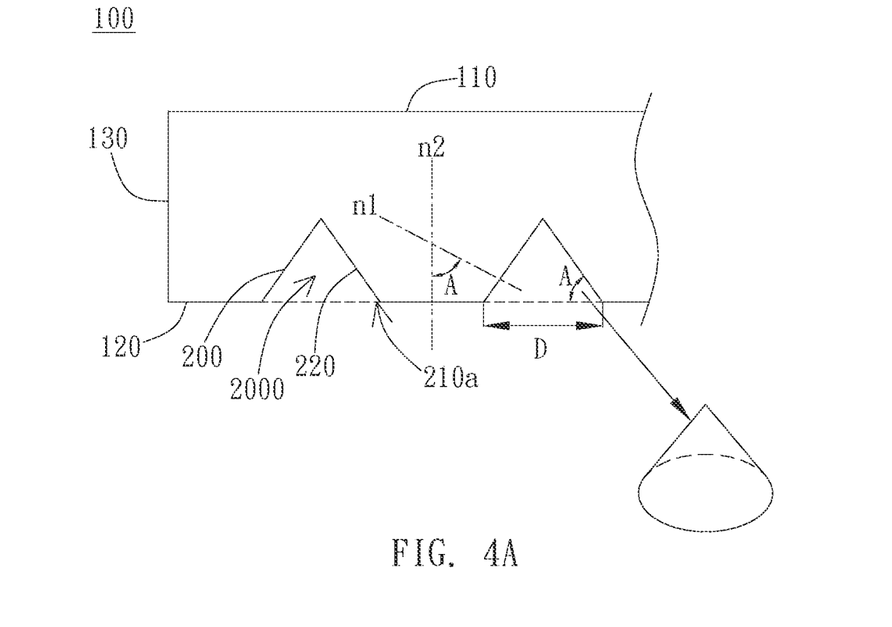
FIGS. 4A-4B are cross-sectional schematic views of another embodiment of the body of the light guide plate of the present invention.
Figure 4B:
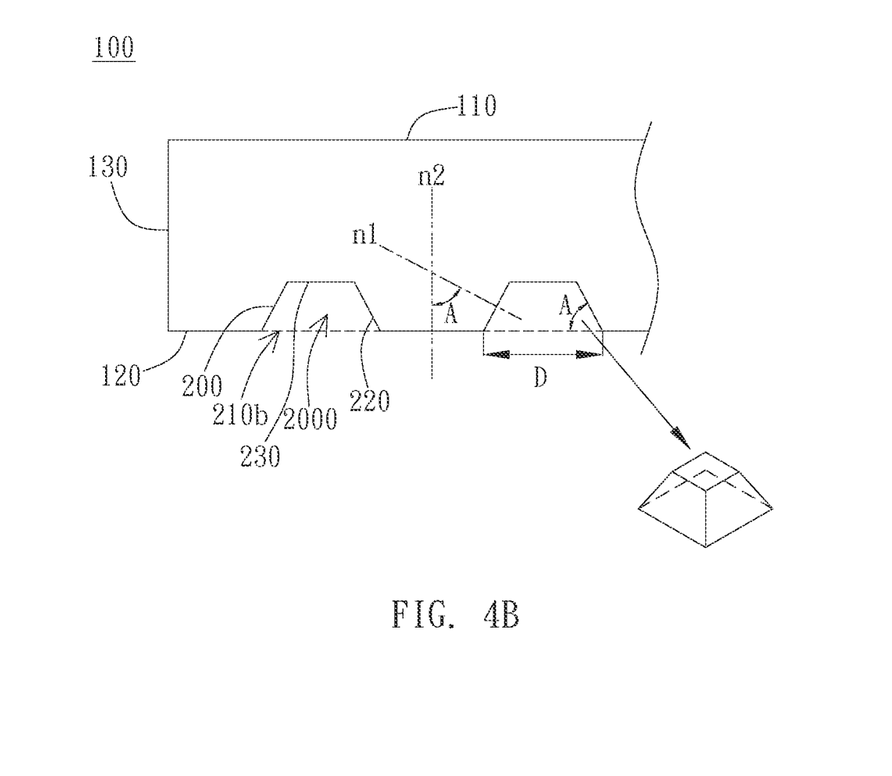

Each of the plurality of microspaces 2000 formed due to the plurality of microstructures has an opening 210a, as shown in FIG. 3A, wherein a perspective view of the microspace 2000 is further shown on the bottom right in FIG. 3A. In addition to the truncated cone shape shown in FIG. 3A, the shape of the space 2000 can include other suitable shapes, such as a cone, a truncated pyramid, or a pyramid as shown in FIG. 4A, 4B, or 4D. For example, the pyramid may be a triangular pyramid, a tetra pyramid, etc. Each space 2000 shrinks in a direction away from the opening 210a or 210b. As a result, when the space 2000 having a truncated cone shape or a truncated pyramid shape has a top portion 230 opposite to the opening 210a or 210b, the area of the top portion 230 is smaller than that of the opening 210; in other words, the projection of the top portion 230 on a plane where the opening 210 lies is within the range of the opening 210.

Figure 4C:
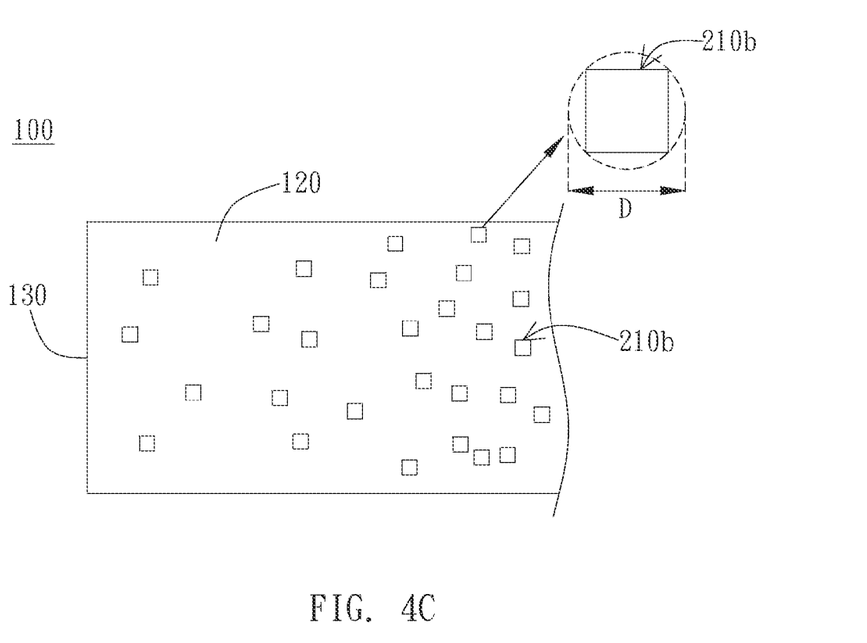
FIG. 4C is a bottom view of the embodiment of the body of the light guide plate shown in FIG. 4B.
Figure 4D:
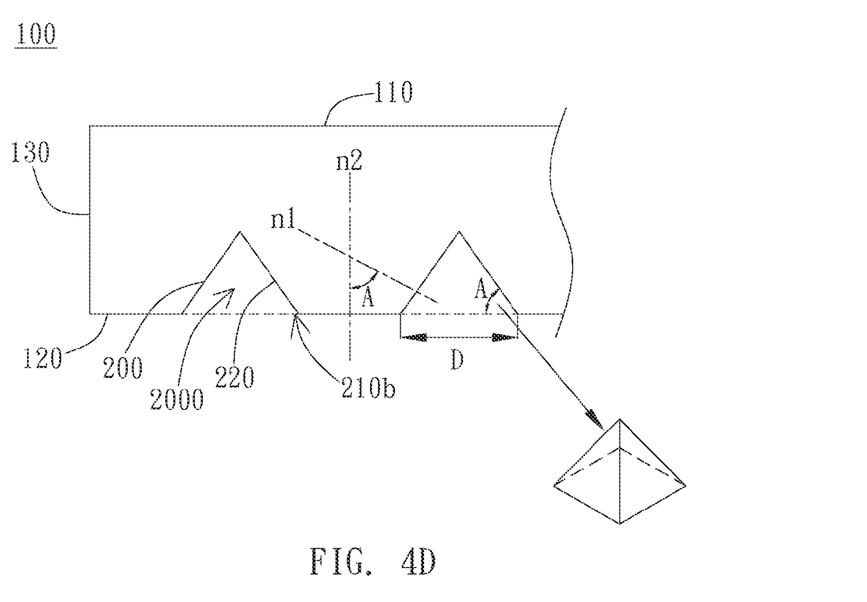
FIGS. 4D-4F are cross-sectional schematic views of another embodiment of the body of the light guide plate of the present invention.

As shown in FIG. 3B, FIG. 3C, and FIG. 4C, which is a bottom view of the embodiment shown in FIG. 4B, the shape of the opening of the space 200 includes a circle or a polygon. In the embodiment that the space 2000 has the cone shape or the truncated cone shape, the shape of the opening 210a is a circle having a diameter D less than 50 micrometer. On the other hand, in the embodiment that the space 2000 has the pyramid shape or the truncated pyramid shape, the shape of the opening 210b is a polygon, wherein the diameter of the circumscribed circle of the polygonal opening 210b is preferably less than 50 micrometer. For example, as the space 2000 is a tetra pyramid with a quadrangular opening 210b, the diameter of the circumscribed circle of the quadrangular opening 210b is preferably less than 50 micrometer.

Figure 4E:
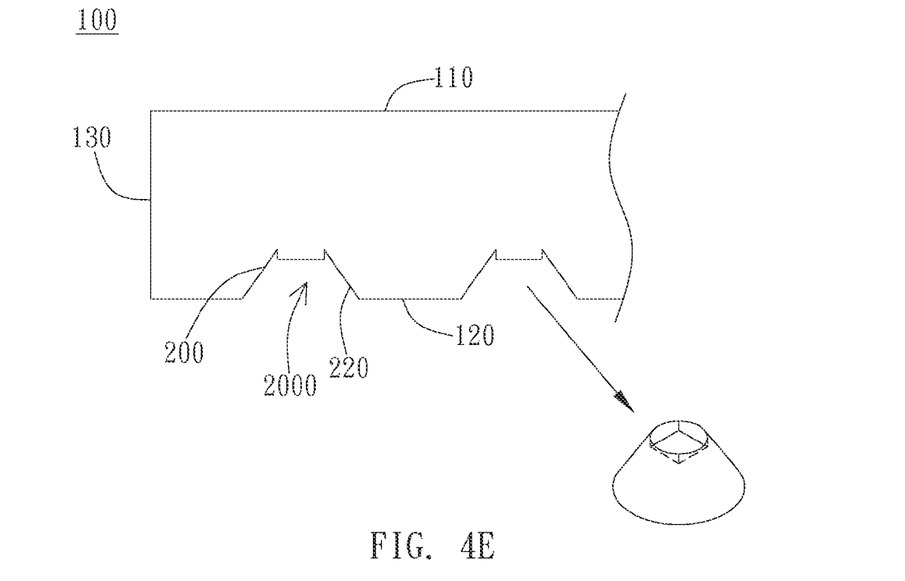
Figure 4F:
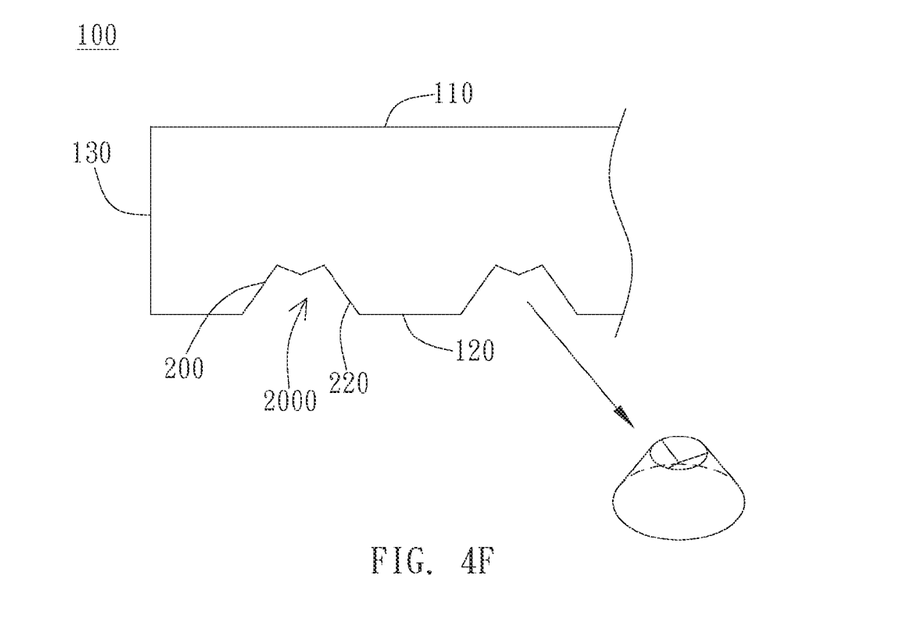

Furthermore, each of the microstructures 200 has a side wall 220 enclosing the space 2000. Since the space 2000 formed due to the microstructure 200 includes the cone shape, the pyramid shape, the truncated cone shape, or the truncated pyramid shape, the space 2000 has a narrow top and a wide bottom so that the side wall 220 inclines to the space 2000. In other words, as shown in FIGS. 3A, 4A, 4B, and 4D, an angle between the normal line n1 of the side wall 220 and the normal line n2 of the bottom 120 is an acute angle A, wherein the acute angle A is preferably less than 50 degrees. If the conditions that the diameter of the opening or the diameter of the circumscribed circle of the opening is less than 50 micrometer and that the acute angle A is less than 50 degrees are fulfilled, the space 2000 formed due to the microstructure 200 is not limited to the above-mentioned shapes. For example, as FIGS. 4E-4F show, the space 2000 may be a cone having a rectangular top cave, a cone having a cone-shaped top cave, or any other possible shapes.

As FIGS. 2 and 5A-5C show, the plurality of light-scattering units 300 of the body 100 are disposed respectively in the plurality of spaces 2000 formed due to the plurality of microstructures 200 recessed in the body 100. The light-scattering unit 300 is composed of at least one diffusive reflective material so as to have optical characteristics different from the body 100. The diffusive reflective material preferably includes titanium dioxide, silicon dioxide, resin, or a combination thereof, wherein the density of the material(s) can be adjusted in accordance with factors such as the thickness of the light guide plate or the height of the microstructure. The light-scattering units 300 are light-diffusive and a value of bidirection scattering distribution function (i.e. a BSDF value) thereof is greater than a value of bidirection scattering distribution function of the body 100. Generally speaking, the light-scattering property (i.e., BSDF) is determined by emitting a light beam with a specific angle of incidence to a sample (e.g., the light-scattering unit 300 of the present invention), and then scanning the space corresponding to the scattering by a sensor to acquire energy of the light scattering in various angles to the space. In addition, the light-scattering property of the light-scattering units 300 is specifically the property of reflective scattering, i.e., after reaching the light-scattering unit 300, the light mostly reflects and scatters, rather than penetrating the light-scattering unit 300 and then scattering.

The light-scattering units 300 can be selectively disposed in the spaces 2000 formed due to the microstructures 200; however, in the preferred embodiment of the present invention, all spaces 2000 formed due to the plurality of microstructures 200 have the light-scattering units 300 disposed therein, respectively. As a result, when the pluralities of microstructures 200 are distributed on the bottom 120 evenly, the light-scattering units 300 are also distributed on the bottom 120 evenly. If the pluralities of microstructures 200 are distributed on the bottom 120 unevenly, the light-scattering units 300 are also distributed on the bottom 120 unevenly. In addition, no matter how the light-scattering units 300 are distributed on the bottom 120, the density of the diffusive reflective material(s) in the light-scattering unit 300 may differ in accordance with the location of the light-scattering unit 300 on the bottom 120. For example, in accordance with different requirement for light exiting from the light-exiting face 110 of the light guide plate 10, the density of the diffusive reflective material(s) in the light-scattering unit 300 gradually decreases or increases as the distance from the light-scattering unit 300 to the light-entering end 130 increases.

Figure 5A:
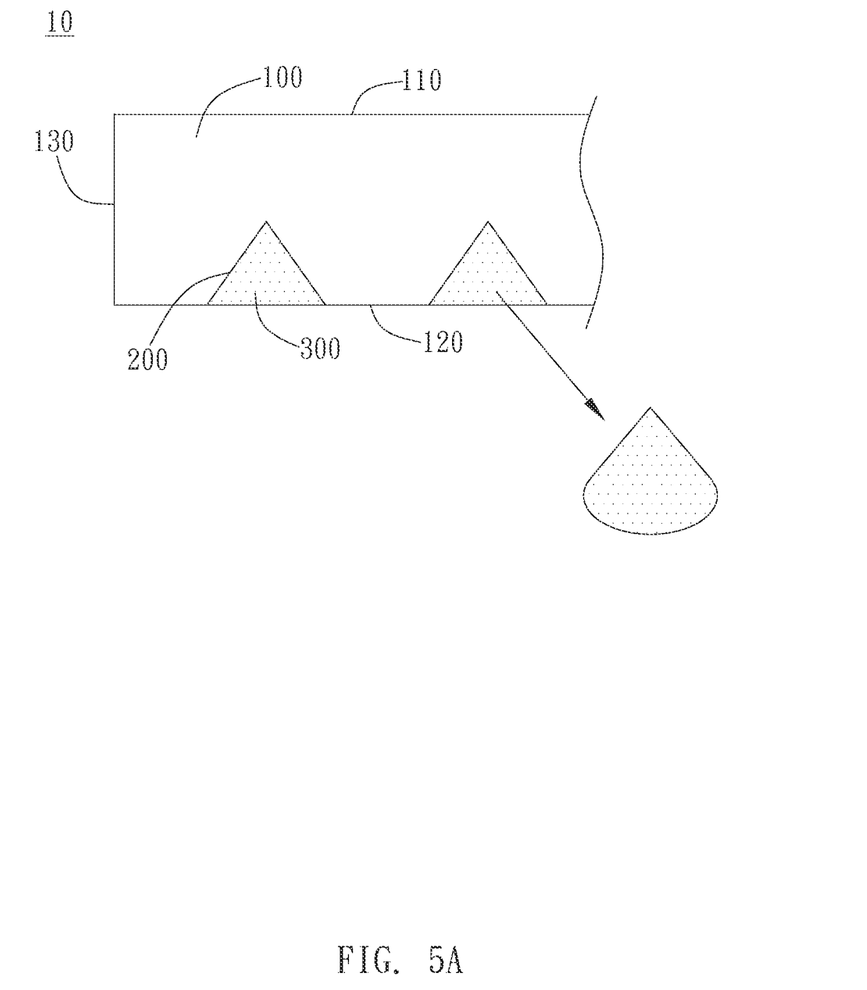
FIGS. 5A-5C are cross-sectional schematic views of another embodiment of the light guide plate of the present invention.
Figure 5B:
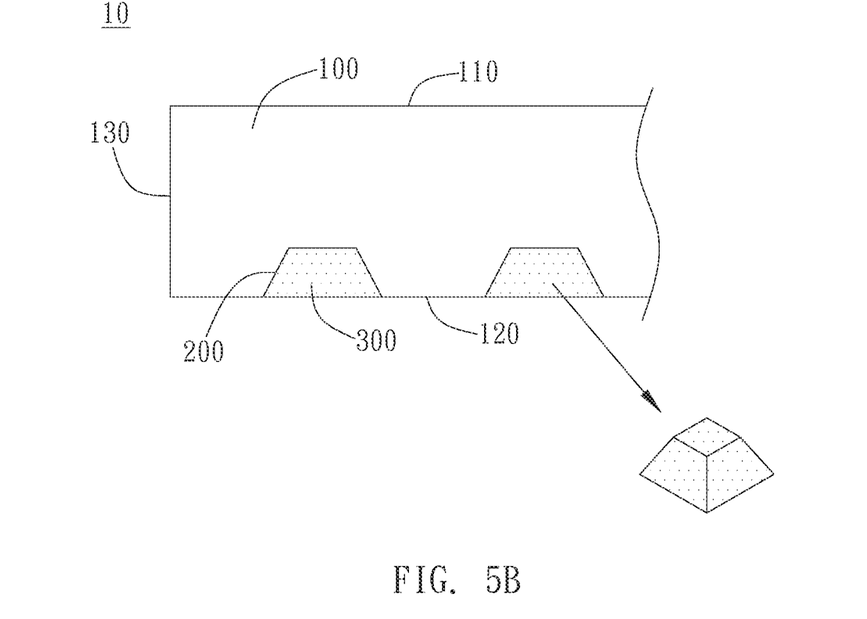
Figure 5C:
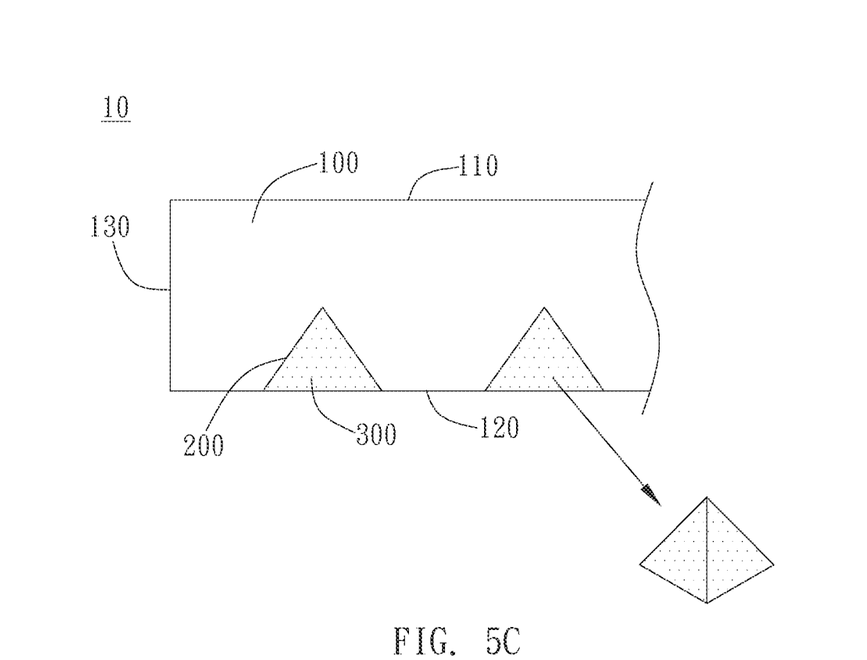
Figure 6:
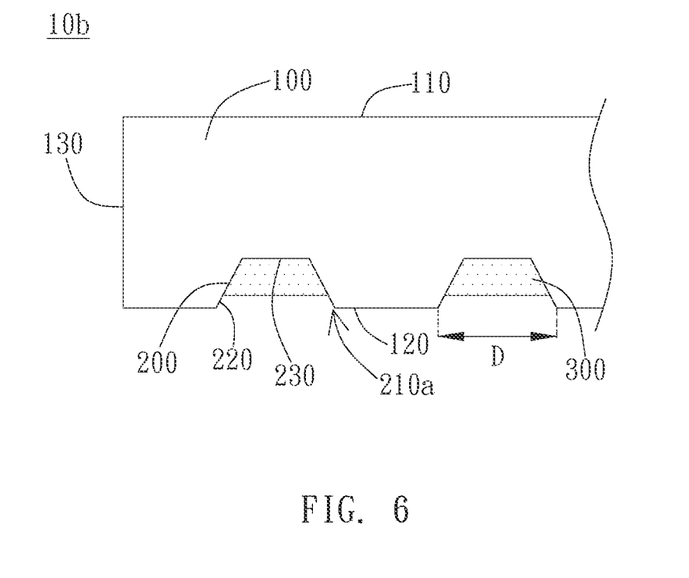
FIG. 6 is a cross-sectional schematic view of another embodiment of the light guide plate of the present invention.
Figure 7:
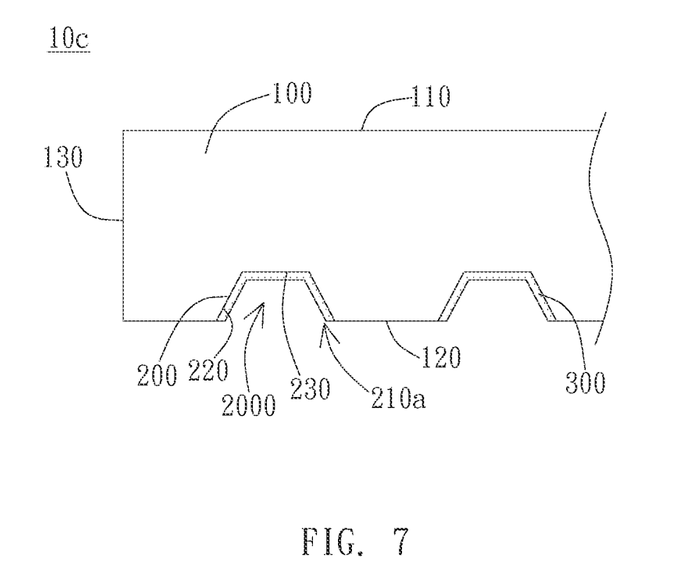
FIG. 7 is a cross-sectional schematic view of another embodiment of the light guide plate of the present invention.

The light-scattering units 300 are preferably disposed in the spaces 2000 in a way substantially completely filling the spaces 2000. As FIG. 2 shows, if the light-scattering unit 300 substantially completely fills the truncated cone-shaped space 2000, the light-scattering unit 300 will have the same truncated cone shape. Similarly, as shown in FIG. 5A, 5B, or 5C, the light-scattering unit 300 will have the cone shape, the truncated pyramid shape, or the pyramid shape. In other embodiments, however, it is not necessary that the light-scattering unit 300 fills the space 2000 completely; that is, the light-scattering units 300 can still have a light-reflective scattering function even not completely filling the spaces 2000. As such, the production cost and the manufacture process can be reduced. As the light guide plate 10b shown in FIG. 6, the light scattering unit 300 occupies the space 2000 mostly but not entirely, wherein the light-scattering unit 300 still intimately contacts the top portion 230 of the space 2000 and the side wall 220 around the top portion 230. In other words, the body 100 of the light guide plate 10 around the microstructures 200 is covered by the diffusive reflective material(s) rather than being exposed to air. Furthermore, in another embodiment as shown in FIG. 7, with regard to the light guide plate 10c, the light-scattering unit 300 can be disposed with a shape conformal to the outline of the space 2000; that is, the light-scattering unit 300 is conformally applied to the surface of the top 230 and the side wall 220. Similarly, the body 100 of the light guide plate 10c shown in FIG. 7A around the microstructures 200 is also covered by the diffusive reflective material(s).

Figure 8:
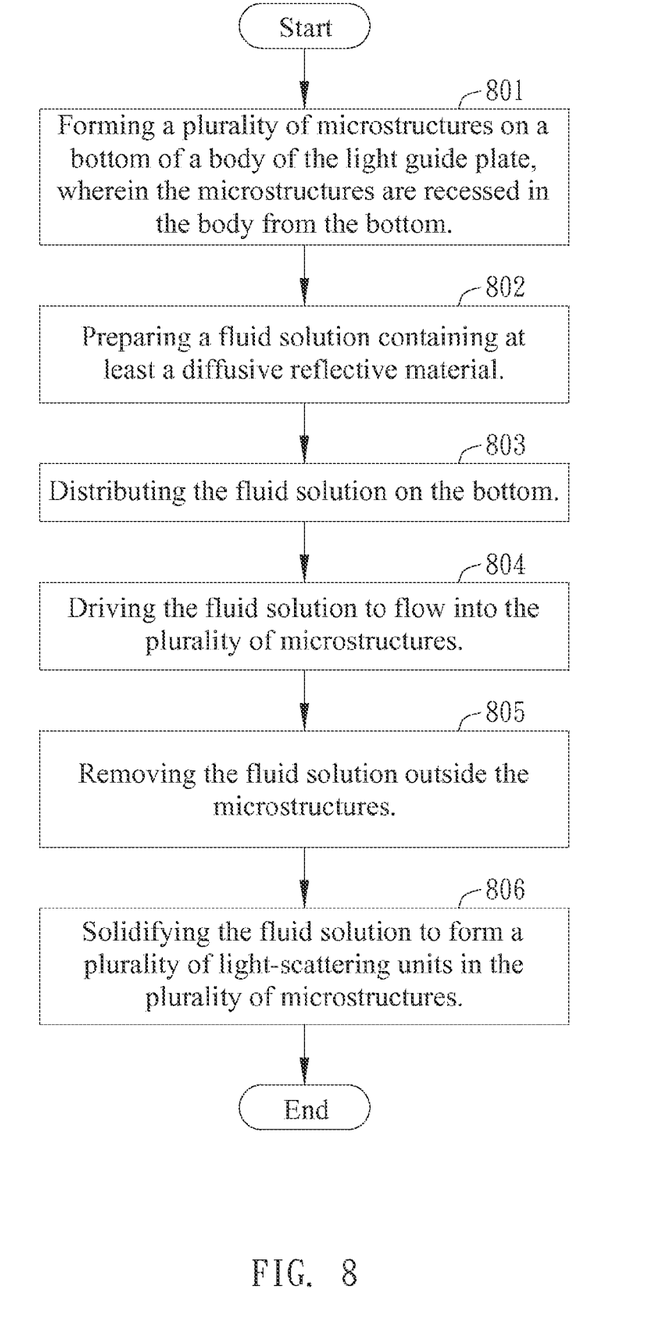
FIG. 8 is a flow chart of a manufacturing method of the light guide plate of the present invention.

The present invention further includes a manufacturing method of the light guide plate. As shown in FIG. 8, in one embodiment, the manufacturing method of the light guide plate includes step 801: forming a plurality of microstructures on the bottom of the body of the light guide plate, wherein the microstructures are recessed in the body from the bottom. For example, in the step 801, when the light guide plate is formed by cutting or injection molding, the microstructures recessed in the body from the bottom can be formed by any suitable process such as etching, electroforming, cutting, or imprinting. In other embodiments, however, the microstructures can be integrally formed simultaneously as the light guide plate is formed. The method further includes step 802: preparing a fluid solution containing at least a diffusive reflective material. In the step 802, it is preferred to choose a photo-curing fluid as the solvent of the solution while titanium dioxide, silicon dioxide, resin, or the combination thereof is used as the solute to be added to the solvent, wherein the solute and the solvent are well mixed to form a homogeneous mixture as the fluid solution. The solute is preferred in a form of powder or microparticle; however the solute can be liquid. The step 802 further includes determining the density of the diffusive reflective material(s) in the light-scattering unit to serve as the basis for the total amount of the solute to be added into the unit volume of the solvent during the preparation of the fluid solution. The step 802 may also include preparing the fluid solutions having different density of the diffusive reflective material(s). The method further includes step 803: distributing the fluid solution on the bottom, wherein the bottom may include the plurality of microstructures formed on the bottom and the plurality of spaces formed due to these microstructures recessed in the body. Specifically, the step 803 includes disposing the light guide plate so that the bottom thereof faces upward, i.e. the openings of the spaces formed due to the microstructures face upward, and then distributing the fluid solution on the bottom, so that the fluid solution flows into the spaces from the openings. In addition, the step 803 may include distributing the fluid solutions having different density of the diffusive reflective material(s) on different portions of the bottom.

In practice, the fluid solution can be controlled to enter the spaces directly. For example, the step 803 can print the bottom with the fluid solution by screen printing. Since the screen printing includes providing a stencil, disposing the stencil on the bottom of the body in a manner that the meshes of the stencil are aligned to the openings of the spaces, and printing. As a result, the steps 803 of screen printing substantially distribute the fluid solution into the spaces formed due to the microstructures directly. After step 803, the method further includes step 804: driving the fluid solution to flow into the plurality of the microstructures. In the preferred embodiment of the present invention, it is preferred to make sure that every space formed due to the microstructure has the fluid solution flowing therein and to ensure that a predetermined amount of the fluid solution is present in the space. In another aspect, in practice, the step 804 can be performed particularly by moving the light guide plate in a speed, such as horizontally shaking the light guide plate on a shaker, in order to increase the flowing speed and the uniformity as the fluid solution flows into the spaces.

Furthermore, taking the manufacturing method of the light guide plate shown in FIG. 2 and FIGS. 5A-5C for example, the step 804 includes driving the fluid solution to substantially completely fill the spaces formed due to the plurality of the microstructures. In another embodiment of the manufacturing method, such as the manufacturing method of the light guide plate 10a shown in FIG. 6, the step 804 preferably includes enabling each of the spaces to have equal amount of the fluid solution. In a further embodiment, such as the manufacturing method of the light guide plate 10c shown in FIG. 7, the step 804 includes enabling the fluid solution to cover the surface of the wall including the side wall and the top portion around the spaces. In sum, the step 804 is performed to ensure that the body of the light guide plate around the microstructures is generally covered by the diffusive reflective material(s), rather than being exposed to air.

The method further includes step 805: removing the fluid solution outside the microstructures, i.e. scraping the fluid solution that is formed outside the microstructures during the steps 803-804 from the bottom by such as a scraper to ensure that the fluid solution remains only in the spaces formed due to the microstructures. On the other hand, if the step 803 involves distributing the fluid solution on the bottom by screen printing, the time required for performing the step 805 will be reduced. In addition, the step 805 will be omitted in the manufacturing method of the light guide plate shown in FIG. 6 or FIG. 7. In step 806: solidifying the fluid solution to form the plurality of light-scattering units in the plurality of microspaces formed due to the plurality of microstructures recessed in the body further includes light curing the fluid solution. The solidified fluid solution contacts tightly the wall around the spaces to form the plurality of light-scattering units of the light guide plate.

Figure 9A:
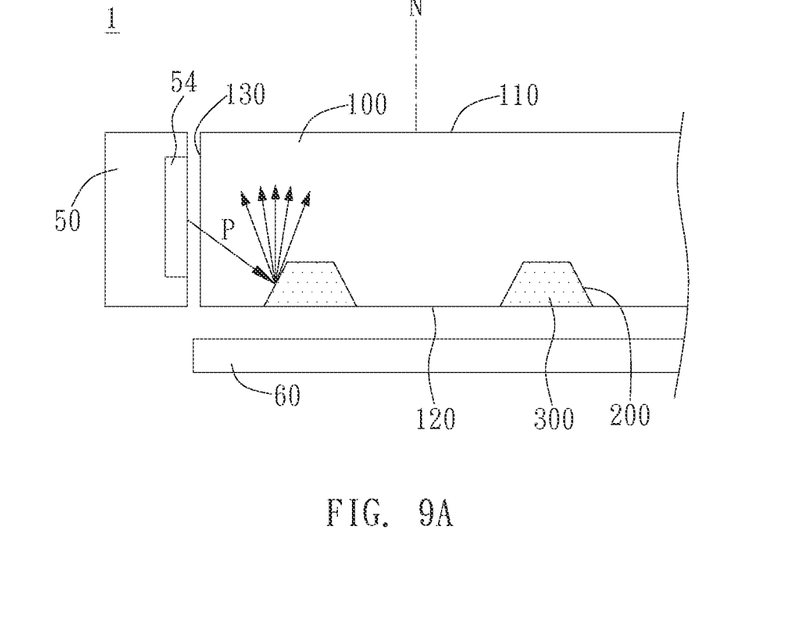
FIG. 9A is a schematic view of the embodiment of the sheetless backlight module of the present invention.

The present invention also includes a sheetless backlight module having the above-mentioned light guide plate or a light guide plate manufactured by means of the above-mentioned method. As the embodiment shown in FIG. 9A, a backlight module 1 includes the light guide plate 10 as shown in FIG. 2, a light source 50, and a reflective plate 60. The light source 50 is disposed at the side of the body 100 of the light guide plate 10 having the light-entering end 130, wherein a light-emitting area 54 of the light source 50 faces the light-entering end 130. The reflective plate 60 is disposed at a side of the light guide plate 10 and faces the bottom 120 of the light guide plate 10. The light emitted from the light-emitting area 54 enters the body 100 of the light guide plate 10 from the light-entering end 130 and advances in a direction away from the light-entering end 130 by total reflection in the body 100. In addition, the propagation of the light in the body 100 includes advancing toward the plurality of microstructures 200. Since the body 100 of the light guide plate 10 around the microstructures 200 is covered by the diffusive reflective material(s), the light advancing toward the microstructures will arrive at the light-scattering units 300 and is then reflected and scattered away from the microstructures 200 to the light path P as shown in FIG. 9A. In other words, the light-scattering units 300 containing the diffusive reflective material(s) increases the light distribution at angles other than the angle of reflection and therefore increases the light emitting angle and solves the problems of hot spot and light ray. Furthermore, in the embodiment shown in FIG. 9A, the reflective plate 60 is composed of reflection material; in other words, a value of bidirection scattering distribution function of the reflective plate 60 is less than the value of bidirection scattering distribution function of the light-scattering units 300. The retro-reflection feature of the reflective plate 60 allows the reflective plate 60 to reflect the light that leaves the light guide plate undiffusively, so that the light can enter the light guide plate again. As a result, the light energy is well utilized and the loss of light energy is reduced.

Figure 9B:
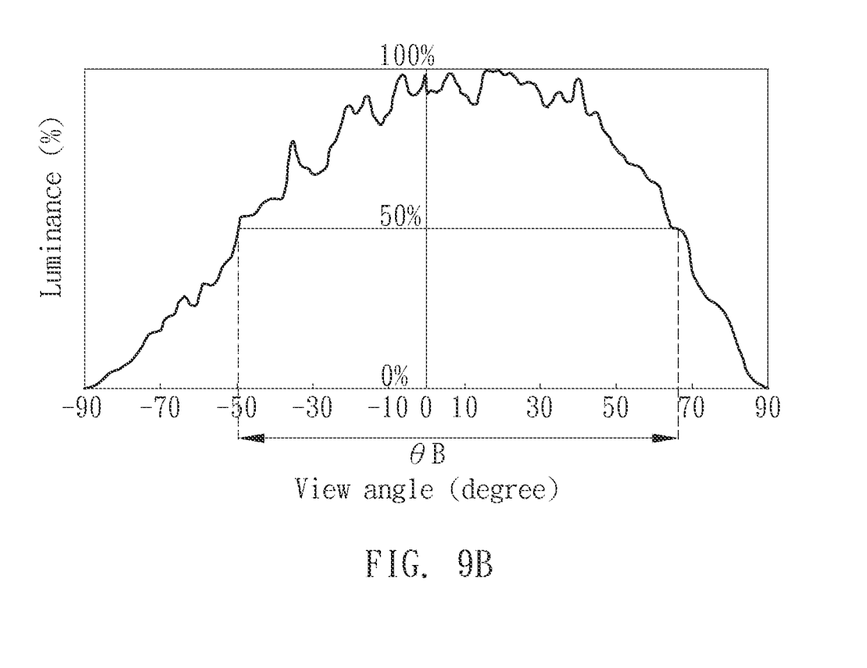
FIG. 9B is a simulation chart of view angle of the embodiment of the sheetless backlight module shown in FIG. 9A.

FIG. 9B is a simulation chart of view angle of the embodiment of the sheetless backlight module shown in FIG. 9A. The abscissa axis represents the view angle ranging from −90 to 90 degrees while the ordinate axis represents a luminance (%) of the light exiting from the light-exiting face 110. Therefore, from FIG. 9B, a percentage of luminance of the light at a certain view angle on the basis of the detectable maximum luminance can be obtained, wherein the view angle is the angle between a viewer and the normal line N of the light-exiting face 110. For example, when the viewer looks at the light-exiting face 110 squarely, the view direction of the viewer is on the normal line N, wherein the view angle is zero degree. Further speaking, if the detectable view angle is wider, a wider range of light-exiting angle can be obtained. If the detectable view angle is narrower, a narrower range of light-exiting angle can be obtained, wherein the light energy is more centralized since the light is focus in a smaller range of exiting-angle.

The simulation charts of the embodiment of the backlight module of the present invention and the conventional backlight module shown in FIG. 9B and FIG. 1B are compared. The angle rangeθB having 50% of the detectable luminance of the light in FIG. 9B is greater than the angle range having 50% of the detectable luminance of the light 8A in FIG. 1B. In other words, the sheetless backlight module 1 shown in FIG. 9A, which has the light guide plate 10 of the present invention, has a wider range of light-exiting angle to solve the problem of small view angle.

Figure 10:
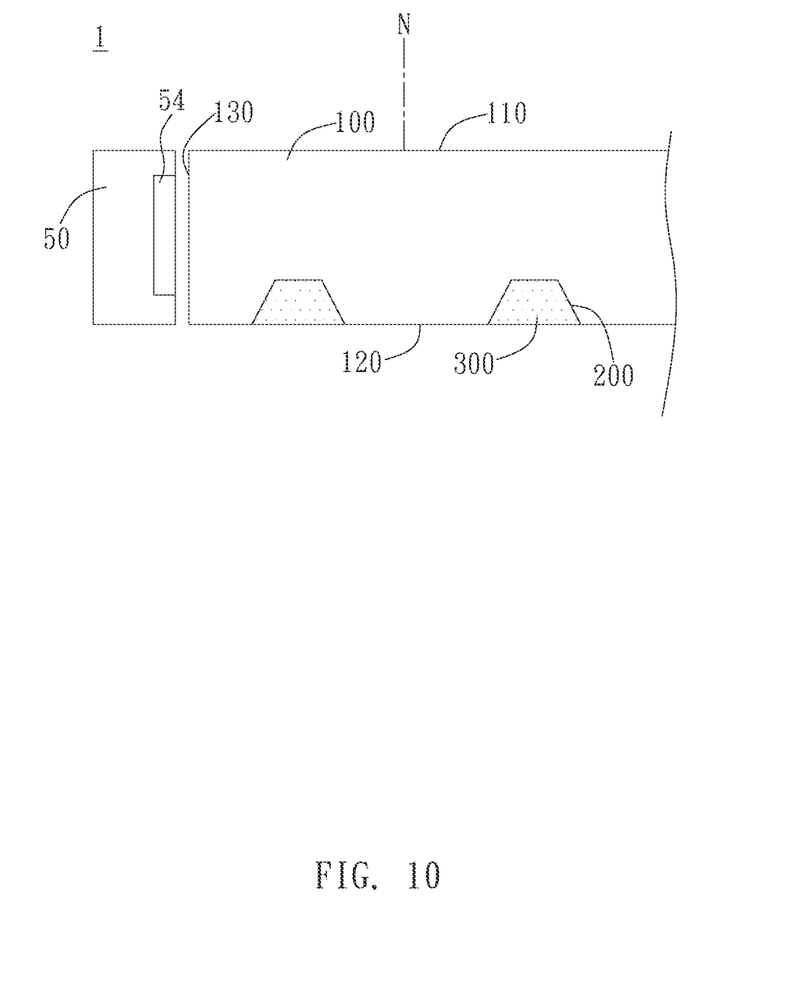
FIG. 10 is a schematic view of another embodiment of the sheetless backlight module of the present invention.

In another aspect, since the light-scattering units 300 distributed on the bottom 120 of the light guide plate 10 prevent the light that arrives at the microstructures 200 with an incident angle smaller than the critical angle from leaving the body 100 and entering the air medium, the loss of light can be reduced and the light utilization efficiency is increased. Accordingly, in other embodiments, the backlight module 1 may not have a reflective plate, as shown in FIG. 10.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A light guide plate for a sheetless backlight module, comprising:
    a body, having:
    a light-exiting face;
    a bottom located opposite to the light-exiting face; and
    a light-entering end located on one side of the light-exiting face and the bottom and connected to the light-exiting face and the bottom;
    a plurality of microstructures formed on the bottom of the body and recessed in the body from the bottom; and
    a plurality of light-scattering units disposed in a plurality of spaces formed due to the plurality of microstructures recessed in the body,
    wherein the body has a value of bidirection scattering distribution function determined by emitting a light beam with a specific angle of incidence to the body, the light-scattering unit has a value of bidirection scattering distribution function determined by emitting a light beam with a specific angle of incidence to the light-scattering unit; the value of bidirection scattering distribution function of the light-scattering units is greater than the value of bidirection scattering distribution function of the body.

2. The light guide plate of claim 1, wherein the light-scattering units fill the spaces formed due to the plurality of microstructures recessed in the body.

3. The light guide plate of claim 1, wherein the shape of the space formed due to each of the plurality of microstructures recessed in the body comprises a cone shape, a truncated cone shape, a cone shape having a cone-shaped top cave, a cone shape having a rectangular top cave, a pyramid shape, or a truncated pyramid shape.

4. The light guide plate of claim 1, wherein the space formed due to each of the plurality of microstructures recessed in the body has an opening on the bottom, the shape of the opening comprises circle or polygon.

5. The light guide plate of claim 4, wherein the diameter of the circle or the diameter of the circumscribed circle of the polygon is less than 50 micrometer.

6. The light guide plate of claim 1, wherein each of the plurality of microstructures has a side wall contacting the light-scattering unit, an acute angle between the normal line of the side wall and the normal line of the bottom is less than 50 degrees.

7. The light guide plate of claim 1, wherein the plurality of light-scattering units is composed of at least a diffusive reflective material.

8. The light guide plate of claim 7, wherein the diffusive reflective material includes titanium dioxide, silicon dioxide, resin, or a combination thereof.

9. The light guide plate of claim 7, wherein the density of the diffusive reflective material in the plurality of light-scattering units gradually increase as the distance to the light-entering end increases.

10. The light guide plate of claim 1, wherein a distribution density of the light-scattering units on the bottom gradually increases as the distance to the light-entering end increases.

11. A sheetless backlight module, comprising:
a backlight module of claim 1; and
a light source disposed at one side of the body having the light-entering end, wherein the light source faces toward the light-entering end.

12. The backlight module of claim 11, further comprising a reflective plate disposed at one side of the light guide plate, wherein the reflective plate faces the bottom of the light guide plate.

13. The backlight module of claim 12, wherein a value of bidirection scattering distribution function of the light-scattering units is greater than a value of the reflective plate.

* * * * *